United States Patent
Uchiyama et al.

(10) Patent No.: US 10,328,621 B2
(45) Date of Patent: Jun. 25, 2019

(54) INJECTION MOLDING SYSTEM

(71) Applicant: FANUC Corporation, Yamanashi (JP)

(72) Inventors: Tatsuhiro Uchiyama, Yamanashi (JP); Yuusuke Imai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 246 days.

(21) Appl. No.: 15/245,230

(22) Filed: Aug. 24, 2016

(65) Prior Publication Data

US 2017/0057135 A1 Mar. 2, 2017

(30) Foreign Application Priority Data

Aug. 26, 2015 (JP) .................. 2015-166342

(51) Int. Cl.
| | |
|---|---|
| B29C 45/03 | (2006.01) |
| B29C 45/76 | (2006.01) |
| G06T 9/00 | (2006.01) |
| G06T 1/00 | (2006.01) |
| G06T 1/60 | (2006.01) |

(52) U.S. Cl.
CPC .............. B29C 45/03 (2013.01); B29C 45/76 (2013.01); G06T 1/0007 (2013.01); G06T 1/60 (2013.01); G06T 9/00 (2013.01); B29C 2945/76173 (2013.01); B29C 2945/76464 (2013.01)

(58) Field of Classification Search
CPC ........... B29C 2945/76173; B29C 2945/76464; B29C 45/03; B29C 45/76; G06T 1/0007; G06T 1/60; G06T 9/00; B41J 5/30; G06F 3/12; H04N 1/21; H04N 1/413

USPC ........................................................ 425/169

See application file for complete search history.

(56) References Cited

U.S. PATENT DOCUMENTS

2011/0181744 A1 7/2011 Hojo et al.

FOREIGN PATENT DOCUMENTS

| CN | 1424854 A | 6/2003 |
|---|---|---|
| CN | 102217299 A | 10/2011 |
| JP | 10-294933 A | 11/1998 |
| JP | 2003-298849 A | 10/2003 |
| JP | 2006175619 A | 7/2006 |
| JP | 2012-27834 A | 2/2012 |

OTHER PUBLICATIONS

JP2006175919A-MT (Year: 2006), Jul. 6, 2006.*
JP2003298849A-MT (Year: 2003), Oct. 17, 2003.*
JP2012027834A-MS (Year: 2012), Feb. 9, 2012.*
Office Action in JP Application No. 2015-166342, dated Sep. 12, 2017, 5 pp.
Office Action in CN Application No. 201610720921.4, dated May 16, 2018, 13pp.

* cited by examiner

*Primary Examiner* — Matthew J Daniels
*Assistant Examiner* — Yunju Kim
(74) *Attorney, Agent, or Firm* — Hauptman Ham, LLP

(57) ABSTRACT

In an injection molding system, a compression ratio of an image acquired by a molded article image acquisition means is changed based on a physical quantity related to injection molding and stored in a storage means. Thus, an image of a molded article is compressed and stored according to the compression ratio obtained based on the physical quantity.

7 Claims, 4 Drawing Sheets

| MINIMUM CUSHION MONITORING | ON | | | |
|---|---|---|---|---|
| DISTRIBUTION POSITION OF DETECTED MINIMUM CUSHION | 3σ or more -3σ or less | 2σ ~3σ -2σ ~-3σ | 1σ ~2σ -1σ ~-2σ | -1σ ~1σ |
| COMPRESSION RATIO | 100% | 90% | 70% | 50% |

| PEAK INJECTION PRESSURE MONITORING | ON | | | |
|---|---|---|---|---|
| DISTRIBUTION POSITION OF DETECTED PEAK PRESSURE | 3σ or more -3σ or less | 1.5σ ~3σ -1.5σ ~-3σ | 0.5σ ~1σ -0.5σ ~-1σ | -0.5σ ~ 0.5σ |
| COMPRESSION RATIO | 100% | 90% | 70% | 50% |

FIG.4

| MINIMUM CUSHION MONITORING | ON |
|---|---|
| CENTRAL VALUE SETTING | 4.50mm |

| MONITORING RANGE SETTING (RELATIVE TO CENTRAL VALUE) | COMPRESSION RATIO SETTING |
|---|---|
| ~+2.00mm | 100% |
| +2.00~+1.50mm | 90% |
| +1.50~+1.00mm | 70% |
| +1.00~-1.00mm | 50% |
| -1.00~-1.50mm | 70% |
| -1.50~-2.00mm | 90% |
| -2.00mm~ | 100% |

| PEAK INJECTION PRESSURE MONITORING | OFF |
|---|---|
| CENTRAL VALUE SETTING | 120MPa |

| MONITORING RANGE SETTING (RELATIVE TO CENTRAL VALUE) | COMPRESSION RATIO SETTING |
|---|---|
| +3MPa~ | 100% |
| +2~+3MPa | 90% |
| +1~+2MPa | 70% |
| -1~+1MPa | 50% |
| -2~-1MPa | 70% |
| -3~-2MPa | 90% |
| ~-3MPa | 100% |

INJECTION MOLDING SYSTEM

RELATED APPLICATIONS

The present application claims priority to Japanese Patent Application Number 2015-166342, filed Aug. 26, 2015, the disclosure of which is hereby incorporated by reference herein in its entirety.

BACKGROUND OF THE INVENTION

Field of the Invention

The present invention relates to an injection molding system.

Description of the Related Art

In a known method for determining the quality (defective or non-defective) of molded articles in molding by an injection molding machine, physical quantities related to the molding are measured directly or indirectly during the molding. In the method for direct measurement, physical quantities of the molded articles, such as the masses and sizes of the molded articles, are measured. In the method for indirect measurement, physical quantities such as pressures (resin pressure, etc.), positions (injection screw position, etc.), speeds (injection screw speed, etc.), and temperatures (injection cylinder and mold temperatures, etc.) are measured. It is also known that images of the molded articles are acquired by an image acquisition means such as a camera and stored in a storage means.

For the acquisition of molded article images, Japanese Patent Application Laid-Open No. 2006-175619 discloses a technique that provides measured values detected by a detector attached to a molding machine and an image pickup device configured to acquire images of molded articles molded by the molding machine. If the measured values when the molding machine molds non-detective articles are within tolerances, according to this technique, the measured values and/or set values and the molded article images acquired by the image pickup device are stored in a database and displayed.

Basically, in the technique disclosed in Japanese Patent Application Laid-Open No. 2006-175619, molded article image data is stored for traceability of the molded articles. An image of molded article is captured during conforming product molding along with measured values of the molded article in order to investigate in detail the cause of the failure if a manufactured molded article itself or a final product that uses it as a conforming product is subject to a problem such as failure.

Thus, an image of each molded conforming product is captured to facilitate quality control of molded articles. If the number of molding cycles increases, therefore, the capacity of a storage means for storing the molded article image data is expected to cover the increase. Although this problem may be solved by increasing the storage capacity of the storage means as required, another problem may sometimes occur that the cost of the storage means increases correspondingly.

SUMMARY OF THE INVENTION

Accordingly, the object of the present invention is to provide an injection molding system capable of suppressing an increase in the storage capacity of a storage means to enable efficient storage of image data of a molded article.

An injection molding system according to the present invention comprises an injection molding machine, a physical quantity acquisition means for acquiring a physical quantity related to injection molding, a molded article image acquisition means for acquiring an image of the molded article manufactured by the injection molding machine, an image compression ratio setting means configured to obtain a compression ratio of the image based on the physical quantity acquired by the physical quantity acquiring means, and a storage means configured to compress and store the image of the molded article according to the compression ratio obtained by the image compression ratio setting means.

Thus, the image of the molded article is compressed and stored according to the compression ratio obtained based on the physical quantity, so that an increase in the storage capacity of the storage means can be suppressed to enable efficient storage of image data of the molded article.

The image compression ratio setting means may obtain the compression ratio of the image based on the statistics of the physical quantity obtained by the physical quantity acquisition means.

The image compression ratio setting means may obtain the compression ratio of the image based on the difference between the acquired physical quantity and an average of the acquired physical quantity.

The injection molding system may comprise a preset monitoring range for the physical quantity and the image compression ratio setting means may obtain the compression ratio of the image according to a compression ratio set corresponding to the monitoring range for the physical quantity.

The image compression ratio setting means may obtain the compression ratio of the image according to a compression ratio set corresponding to the deviation of the physical quantity.

Thus, the compression ratio is assumed to be fixed based on the statistics of the physical quantity. If the percentage of mixing of defectives near a central value is low due to the value of the physical quantity, for example, the importance of the storage of the molded article image data is so low that size of the image is reduced by compression. If the physical quantity is deviated from the central value, that is, if the percentage of mixing of defectives is high, the molded article image data can be stored with its resolution maintained at the time of image acquisition without being unduly compressed.

The storage means may correspondingly store the physical quantity related to injection molding acquired by the physical quantity acquisition means and the image of the molded article compressed according to the compression ratio obtained by the image compression ratio setting means.

Thus, the physical quantity and the image of the molded article are stored correspondingly, so that the relationship between the physical quantity and the image data can be made clearer.

According to the present invention, there can be provided an injection molding system capable of suppressing an increase in the storage capacity of a storage means to enable efficient storage of image data of a molded article.

BRIEF DESCRIPTION OF THE DRAWINGS

The above and other objects and features of the present invention will be obvious from the ensuing description of embodiments with reference to the accompanying drawings, in which:

FIG. 4 is a diagram showing a method for obtaining compression ratios according to another embodiment of the present invention.

DETAILED DESCRIPTION OF THE PREFERRED EMBODIMENTS

The present invention is characterized in that the compression ratio of image data of molded articles is changed depending on physical quantities related to injection molding. While the physical quantities related to injection molding are changing near the central values of tolerances for quality determination on the molded articles, the possibility of defectives being mixed in the molded articles molded during the change is low. If the physical quantities for injection molding are deviated from the central values though they are within the ranges of the tolerances, in contrast, the possibility of mixing of defectives increases.

Thus, if the physical quantities for injection molding are deviated from the central values, the resolution of the image data of the molded articles at the time of image acquisition is maintained so as not to unduly compress the image data. If the physical quantities are close to the central values, in contrast, the possibility of mixing of defectives is so low that the compression ratio is increased. In this way, the data size of the entire molded article images can be saved, so that an increase in the storage capacity can be suppressed.

Figure 1:
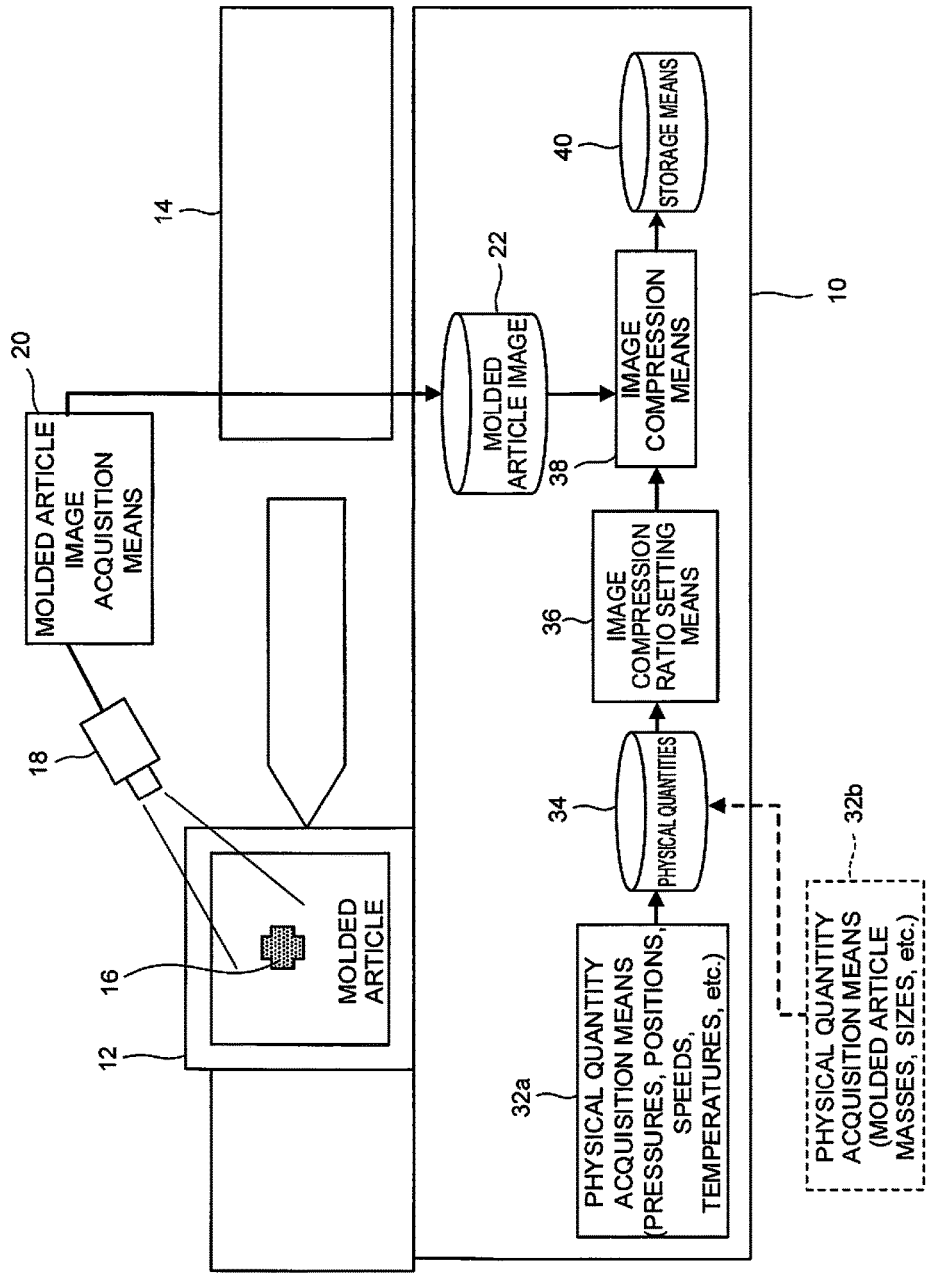
FIG. 1 is a diagram showing a configuration of an injection molding machine according to an embodiment of the present invention.

An embodiment of the present invention will now be described with reference to the accompanying drawings. FIG. 1 is a diagram showing a configuration of an injection molding machine of the present embodiment.

An injection molding machine 10 comprises a mold clamping device 12 and an injection device 14 disposed on a machine base. A molded article 16 is molded in the mold clamping device 12. An image of the molded article 16 is captured by a camera 18 for use as an image pickup device. Captured image data is acquired by a molded article image acquisition means 20 and sent as a molded article image 22 to the injection molding machine 10.

The injection molding machine 10 comprises a physical quantity acquisition means 32, which serves to acquire physical quantities for injection molding. In FIG. 1, a physical quantity acquisition means 32a for indirectly acquiring physical quantities for injection molding such as pressures (resin pressure, etc.), positions (injection screw position, etc.), speeds (injection screw speed, etc.), and temperatures (injection cylinder and mold temperatures, etc.) is shown separately from a physical quantity acquisition means 32b for directly acquiring the molded article masses, sizes, and the like. However, these means are only different according to whether the physical quantities for injection molding are directly measured or whether the physical quantities of the molded articles are acquired by measuring the ambient environment. All these physical quantities can be handled in the same manner as physical quantities for injection molding.

Numeral 34 denotes physical quantities that are acquired by the physical quantity acquisition means 32 and sent to an image compression ratio setting means 36. In the image compression ratio setting means 36, an image compression method and the compression ratio are set and the set image compression method is sent to an image compression means 38. Various specific compression methods and compression ratio setting methods will be described later.

In the image compression means 38, the molded article image 22 is compressed by the image compression method set in the image compression ratio setting means 36. The image compressed by the image compression means 38 is sent to and stored in a storage means 40. In storing the image, the physical quantities 34 acquired in the physical quantity acquisition means 32 should preferably be stored together with the compressed image. By doing this, the relationship between the physical quantities and the image data can be clarified.

Figure 2:
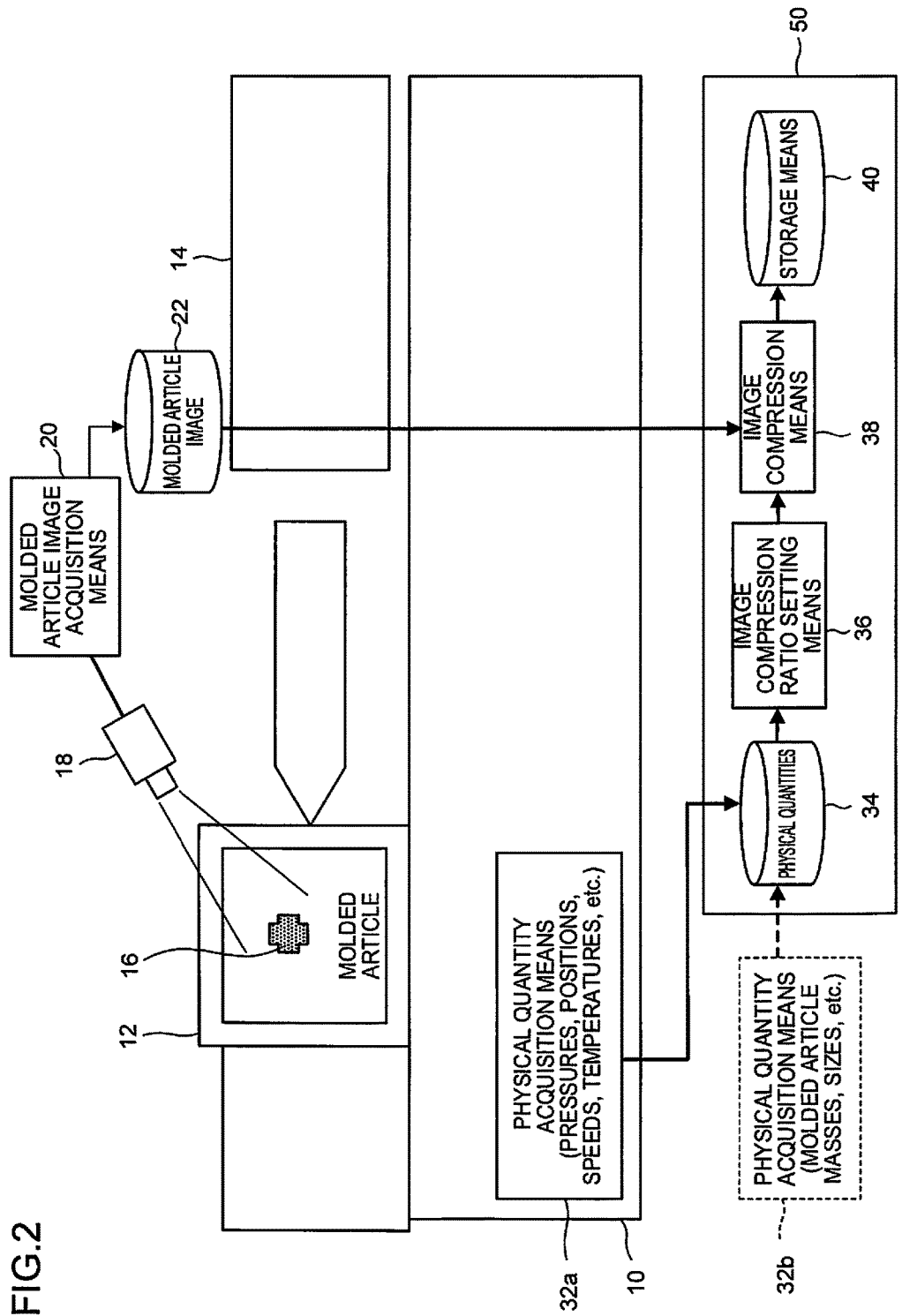
FIG. 2 is a diagram showing a configuration of an injection molding machine according to a modification of the present invention.

FIG. 2 shows a modification of the configuration of the injection molding machine shown in FIG. 1. While the example shown in FIG. 2 is constructed in the same manner as the example shown in FIG. 1, it differs from the example of FIG. 1 in that a part of the configuration is provided on a management device 50 provided for centralized management of the injection molding machine 10. Specifically, as shown in FIG. 2, the image compression ratio setting means 36, image compression means 38, and storage means 40 are arranged on the management device 50. The two examples are similar in that the physical quantities 34 for injection molding are acquired from the physical quantity acquisition means (32a and 32b) and sent to the image compression ratio setting means 36 and processed thereafter.

The following is a description of a compression method and a compression ratio setting method used in the image compression ratio setting means 36 and the image compression means 38. First, image compression methods include GIF, PNG, TIFF, or the like of a lossless compression type and JPEG or the like of a lossy compression type, which can be appropriately selected.

In the present embodiment, the term "compression ratio" is defined as the ratio between data sizes before and after compression. As indicated by equation (1), the greater the difference between physical quantity and an average of physical quantities, the higher the compression ratio of the molded article image data is. In equation (1), K is a coefficient (positive number) to be set as required.

$$\text{Compression ratio} = |\text{acquired physical quantity} - \text{average of physical quantities}| \times K. \quad (1)$$

Although the average of the physical quantities is substantially fixed after molding a certain number of shots, it is not yet fixed before molding a certain number of shots. Therefore, the obtained image data may be previously stored without being compressed or stored and compressed by lossless compression until a predetermined number of times for the fixation of a certain average is molded. When the certain average is fixed after the predetermined number of shots are molded, in this case, the previously stored image data may be compressed based on the fixed average.

If there are a plurality of types of acquired physical quantities, moreover, the compression ratio may be obtained based on a selected type of physical quantities. Compression ratios may be obtained individually for the physical quantities so that a maximum, or otherwise, a minimum of the obtained compression ratios can be employed. Alternatively, an average of a plurality of compression ratios obtained individually for the physical quantities may be employed.

In storing the molded article image data, the image data may be stored corresponding to the physical quantities 34 related to an acquired molding cycle. In order to further suppress the storage capacity of the storage means 40, the acquisition timing of the molded article image data may be based on each predetermined molding cycle or any molding cycle, in place of each molding cycle.

Figures 3A, 3B:
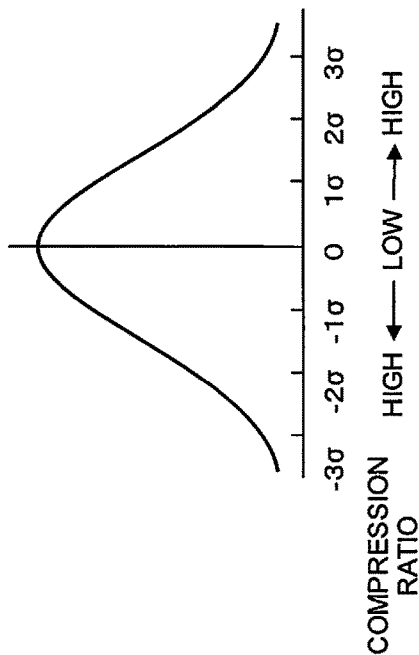
FIG. 3A is a diagram showing a method for obtaining compression ratios according to one embodiment of the present invention and shows how physical quantities are normally distributed around an average.
FIG. 3B is a diagram showing how to set a compression ratio according to the one embodiment of the present invention.

Another method for obtaining compression ratios will now be described with reference to FIGS. 3A and 3B. FIG. 3A shows how the physical quantities are normally distributed around the average. In FIG. 3A, symbol a denotes the value of a standard deviation. FIG. 3B shows how to set a specific compression ratio. If the physical quantity is a minimum cushion, the compression ratio is set to 50% with a detected minimum cushion of −1 to 1 σ; to 70% with −1 to −2 σ or 1 to 2 σ, to 90% with 2 to 3 σ or −2 to −3 σ, or to 100% (no compression) with 3 σ or more or −3 σ or less.

If the physical quantity is a peak injection pressure, moreover, the compression ratio is set to 50% with a detected peak injection pressure of −0.5 to 0.5 σ; to 70% with 0.5 to 1 σ or −0.5 to −1, to 90% with 1.5 to 3 σ or −1.5 to −3 σ, or to 100% (no compression) with 3 σ or more or −3 σ or less.

Still another method for obtaining compression ratios will now be described with reference to FIG. 4. In the present embodiment, monitoring ranges are set around central values and the compression ratios are set corresponding to the monitoring range. The individual compression ratios are shown in the table of FIG. 4. The nearer any of the compression ratios are to the central values, the more compressed the resulting values are. The image data is unduly compressed so that the set compression ratios increase with distance from the central values.

In these embodiments, the image data is not unduly compressed when the physical quantities are far from the central values and is heavily compressed to reduce the image data capacity when the physical quantities are close to the central values. If the increase of the storage capacity should be further suppressed, for example, the image data may be more heavily compressed on the side nearer to the central values or image data may be not stored.

Although the difference from the average and the standard deviation are used to determine the compression ratios according to the present embodiment, furthermore, the compression ratios may be determined by some other statistical methods.

The invention claimed is:

1. An injection molding system, comprising:
   an injection molding machine;
   a physical quantity acquisition means for acquiring a physical quantity related to injection molding;
   a molded article image acquisition means for acquiring an image of the molded article manufactured by the injection molding machine;
   a processor configured to obtain at least three stages of a compression ratio of the image; and
   a storage means configured to compress and store the image of the molded article according to the compression ratio obtained by the processor,
   wherein the processor is configured to set such that the greater a difference between the physical quantity acquired by the physical quantity acquisition means and an average of two or more of the physical quantity, the higher stage of the compression ratio.

2. The injection molding system according to claim 1, wherein the processor is configured to set the compression ratio according to an equation Compression ratio=|acquired physical quantity−average of physical quantities|×K, where K is a positive number.

3. The injection molding system according to claim 1, wherein the average of the physical quantities is substantially fixed after the injection molding machine molds a predetermined number of the molded articles.

4. The injection molding system according to claim 3, wherein the image acquired by the molded article image acquisition means is either previously stored without being compressed or stored and compressed by lossless compression, until the predetermined number of the molded articles are molded and the average of the physical quantities is fixed.

5. The injection molding system according to claim 4, wherein when the average of the physical quantities is fixed after the predetermined number of the molded articles are molded, the previously stored image is compressed based on the fixed average of the physical quantities.

6. The injection molding system according to claim 3, wherein when there are a plurality of types of acquired physical quantities, the processor is configured to
   obtain the compression ratio based on a selected type of physical quantities, or
   obtain a plurality of compression ratios each individually for one of the physical quantities and one of a maximum, a minimum, or an average of the plurality of obtained compression ratios is employed for compressing the image acquired by the molded article image acquisition means.

7. The injection molding system according to claim 1, wherein the image of the molded article is stored corresponding to the physical quantity related to an acquired molding cycle of the injection molding machine, and an acquisition timing at which the image of the molded article is acquired by the molded article image acquisition means is based on each molding cycle, a predetermined molding cycle, or any one of the molding cycles.

* * * * *